United States Patent [19]

Meguro

[11] Patent Number: 4,774,617
[45] Date of Patent: Sep. 27, 1988

[54] MAGNETIC TAPE CASSETTE WITH IMPROVED BRAKE ASSEMBLY

[75] Inventor: Hiroshi Meguro, Miyagi, Japan

[73] Assignee: Sony Corporation, Tokyo, Japan

[21] Appl. No.: 7,356

[22] Filed: Jan. 27, 1987

[30] Foreign Application Priority Data

Jan. 31, 1986 [JP] Japan .................. 61-12890[U]

[51] Int. Cl.[4] .......................................... G11B 23/087
[52] U.S. Cl. .................................................. 360/132
[58] Field of Search ...................... 360/132; 242/198

[56] References Cited

U.S. PATENT DOCUMENTS 4,572,461  2/1986  Horikawa et al. ................ 360/132
4,635,879  1/1987  Sumida et al. .................... 360/132
4,678,138  7/1987  Nemoto ............................ 360/132

Primary Examiner—Robert S. Tupper
Attorney, Agent, or Firm—Hill, Van Santen, Steadman & Simpson

[57] ABSTRACT

A magnetic tape cassette having within its cassette housing a pair of reel hubs around which a magnetic tape is wound, a brake member for restricting the rotation of the reel hubs and a spring for biasing the brake member. One end of the spring for biasing the brake member is trapped in a space between a surface of an upper half of the cassette housing and the top surface of an offset front wall of a lower half thereof so that the spring is confined and supported positively.

3 Claims, 5 Drawing Sheets

MAGNETIC TAPE CASSETTE WITH IMPROVED BRAKE ASSEMBLY

BACKGROUND OF THE INVENTION

1. Field of the Invention

The present invention relates generally to a tape cassette for use in recording a digital signal, such as, a PCM (pulse code modulated) signal and the like. More particularly, this invention relates to a tape cassette in which a spring for biasing a brake member to restrict the rotation of a reel hub can be positively prevented from being positionally displaced.

2. Description of the Prior Art

There has been proposed a PCM (pulse code modulated) signal recording and reproducing apparatus in which an analog signal such as an audio signal or the like is converted to a digital signal, for example a PCM signal, and then recorded on (or reproduced from) a magnetic tape. The known PCM recording and reproducing apparatus utilizes a rotary magnetic head so as to provide a relatively high recording density. According to such PCM recording and reproducing apparatus utilizing the rotary magnetic head, upon recording and/or reproducing, a magnetic tape is drawn out of a tape cassette, loaded on a rotary drum on which the rotary magnetic head is mounted, and then the recording and/or reproducing is carried out.

It has been found that in the case of a magnetic tape, if a user touches the magnetic tape with his fingers and smudges the tape with an oily component or dust, a dropout will occur in the reproduced signal. Accordingly, it is important that the magnetic tape incorporated in the tape cassette be sealed as tightly as possible so as to protect the tape from being touched by the user with his fingers or being open to dust and the like.

As a prior art tape cassette of this kind, there is one previously proposed by the assignee of the present application as, for example, Japanese Utility Model application No. 60-156119.

This previously proposed tape cassette will be described with reference to FIGS. 1 to 3.

In the figures, reference numeral 1 designates a cassette housing. The cassette housing 1 is formed of a pair of an upper half 2 and a lower half 3 that are screwed together. A transparent window plate 2a is formed on an upper surface portion of the upper half 2. A pair of reel hubs 4a and 4b are incorporated within the cassette housing 1, and are rotatably inserted through a pair of reel shaft insertion openings 5a and 5b formed through the lower half 3 at its predetermined positions. A magnetic tape 6 is carried by, and wound around, the pair of reel hubs 4a and 4b.

Tape guide posts 7a and 7b are provided near the left and right side wall portions of the lower half 3 in opposing relation to the front portion of the cassette housing 1. The magnetic tape 6 is wound around the tape guide posts 7a and 7b so as to freely travel relative to the front portion of the cassette housing 1 at its predetermined design position. A substantially rectangular-shaped cut-away portion 3a is formed through the lower half 3 over a predetermined width, behind the magnetic tape 6 wound around the tape guide posts 7a and 7b. The cut-away portion 3a and the inside of the cassette housing 1 are shielded by a front wall 2b of the upper half 2 and a front wall 3b of the lower half 3. Upon recording or reproducing, a guide system for drawing the magnetic tape 6 is inserted into the cut-away portion 3a from the recording and reproducing apparatus, not shown.

A front lid 8 is pivotally supported at the front side of the cassette housing 1 by arm portions 8a and 8b such that the front lid 8 is able to open and close the front portion of the cassette housing 1.

A slider or sliding member 9 of substantially C-shaped cross section is slidable back and forth in opposing relation to in the lower surface portion and the left and right side walls of the lower half 3. Reel shaft insertion corresponding openings 9a and 9b are formed through the sliding member 9 to correspond to the reel shaft insertion openings 5a and 5b when the sliding mmber is slid backward so as to expose the cut-away portion 3a.

When the sliding member 9 is slid forward, and the state that the front lid 8 is closed, the reel shaft insertion corresponding openings 9a and 9b are arranged so as not to correspond to the reel shaft insertion openings 5a and 5b of the cassette housing 1 and the cut-away portion 3a of the cassette housing 1 is closed with the result that the inside of the cassette housing 1 is tightly, substantially completely, sealed. Thus, the magnetic tape 6 is protected from being smudged and is prevented from being touched by the fingers of a user.

In this condition, side plate portions 9c and 9d of the sliding member 9 are placed below the arm portions 8a and 8b of the front lid 8, the upper end edges of the side wall portions 9c and 9d of the sliding member 9 abut against the lower end edges of the arm portions 8a and 8b of the front lid 8 to thereby lock the front lid 8 so as to prevent its pivoting, the front lid 8 being thereby prevented from being opened unintentionally.

In order to prevent that in this non-use state, the tape reels 4a and 4b housed in the tightly-sealed cassette housing 1 are rotated unintenionally, and hence the magnetic tape 6 is slackened, due to vibration, shock or the like, a reel brake member 11 is provided within the cassette housing 1.

The brake member 11, of substantially U-shaped cross section, is formed of an upper support plate portion 11a extended along the rear surface of the upper half 2, and leg portions 11b and 11c which extend downwardly from the left and right end portions of the upper support plate portion 11a. At the rear end edge of the upper support plate portion 11a, brake projection members 11d and 11e project into association with ratchet wheel portions 4c and 4d formed around the respective reel hubs 4a and 4b. Operation portions 11g and 11h are formed on the end portions of the leg portions 11b and 11c of the upper support plate portion 11a.

To projecting pin 13 formed at the central portion of the upper support plate portion 11a of this brake member 11, there is attached a spring 14 which extends so as to become V-shaped as it approaches its both end portions. The curbed end portions of this spring 14 are closely contacted with and engaged with the rear surface of the front wall 2b of the upper half 2.

Left and right elongated openings 15 are formed through the upper support plate portion 11a of this brake member 11. This brake member 11 is attached through the elongated openings 15 to pins 16 that project downward from the rear surface of the upper half 2 such that the brake member 11 is slidable back and forth relative to the pins 16.

When the tape cassette is stored, or the tape cassette is not in use, this brake member 11 is slid backwards by the spring or biasing force of the spring 14 and the brake projections 11d and 11e are engaged with the ratchet wheels 4c and 4d of the reel hubs 4a and 4b to thereby lock the reel hubs 4a and 4b against rotation. Futher, when the brake member 11 is located within the cassette housing 1, end portions 11g and 11h of the operation portions are projected through operation portion insertion openings 12a, 12b of the lower half 3 to the outside of the side wall front end portions thereof by a predetermined amount. Accordingly, when the front lid 8 is pivoted upwards, the projecting portions 11g and 11h are contacted by the end portions of the arm portions 8a and 8b of the front lid 8, and the brake member 11 is slid forward against the spring or biasing force of the spring 14 so that the brake projections 11d and 11e are disengaged from the ratchet wheels 4c and 4d of the reel hubs 4a and 4b, permitting the reel hubs 4a and 4b to become rotatable.

In such prior art tape cassettes, however, since the end portions of the spring 14 of the brake member 11 only make contact with the rear surface of the front wall 2b of the upper half 2, it may occur, due to the impact when the tape cassette is assembled or when it is dropped, that the end portions of the spring 14 on the front wall 2b and become displaced downwards. Then the spring 14 cannot give the necessary positive biasing force to the brake member 11 and the spring 14 may interfere with the magnetic tape 6, etc.

OBJECTS AND SUMMARY OF THE INVENTION

Accordingly, it is an object of this invention to provide an improved magnetic tape cassette.

It is another object of this invention to provide an improved magnetic tape cassette in which an end portion of a spring for biasing a brake member is supported at an upper end face of a front wall of a lower cassette half so that even when the cassette housing is shocked considerably, the spring is prevented from escaping from a position between the front wall of the lower half and a rear side of the upper half.

It is a further object of this invention to provide a magnetic tape cassette in which a magnetic tape can be protected from interference with the end portion of the spring which is used to bias the brake member.

According to one embodiment of the present invention, a magnetic tape cassette is provided comprising:

(a) a cassette housing formed of an upper half and a lower half;

(b) a pair of reel hubs incorporated in said cassette housing and around which a magnetic tape is wound;

(c) a brake member for restricting the rotation of said pair of reel hubs; and (d) spring means having a V-shaped portion at its intermediate portion for biasing said brake member in such a direction that said brake member is engaged with said pair of reel hubs, the spring means being fixed at its intermediate portion to said brake member and its end portions contact with a rear surface of a front wall of said upper half, wherein the front wall of said lower half is positioned rearward from the front wall of said upper half, whereby the end portions of said spring means are entrapped by an upper surface of the front wall of said lower half.

These and other objects, features and advantages of the present invention will become apparent from the following detailed description of the preferred embodiment taken in conjunction with the accompanying drawings, throughout which like reference numnerals designate like elements and parts

DESCRIPTION OF THE PREFERRED EMBODIMENT

Figure 1:
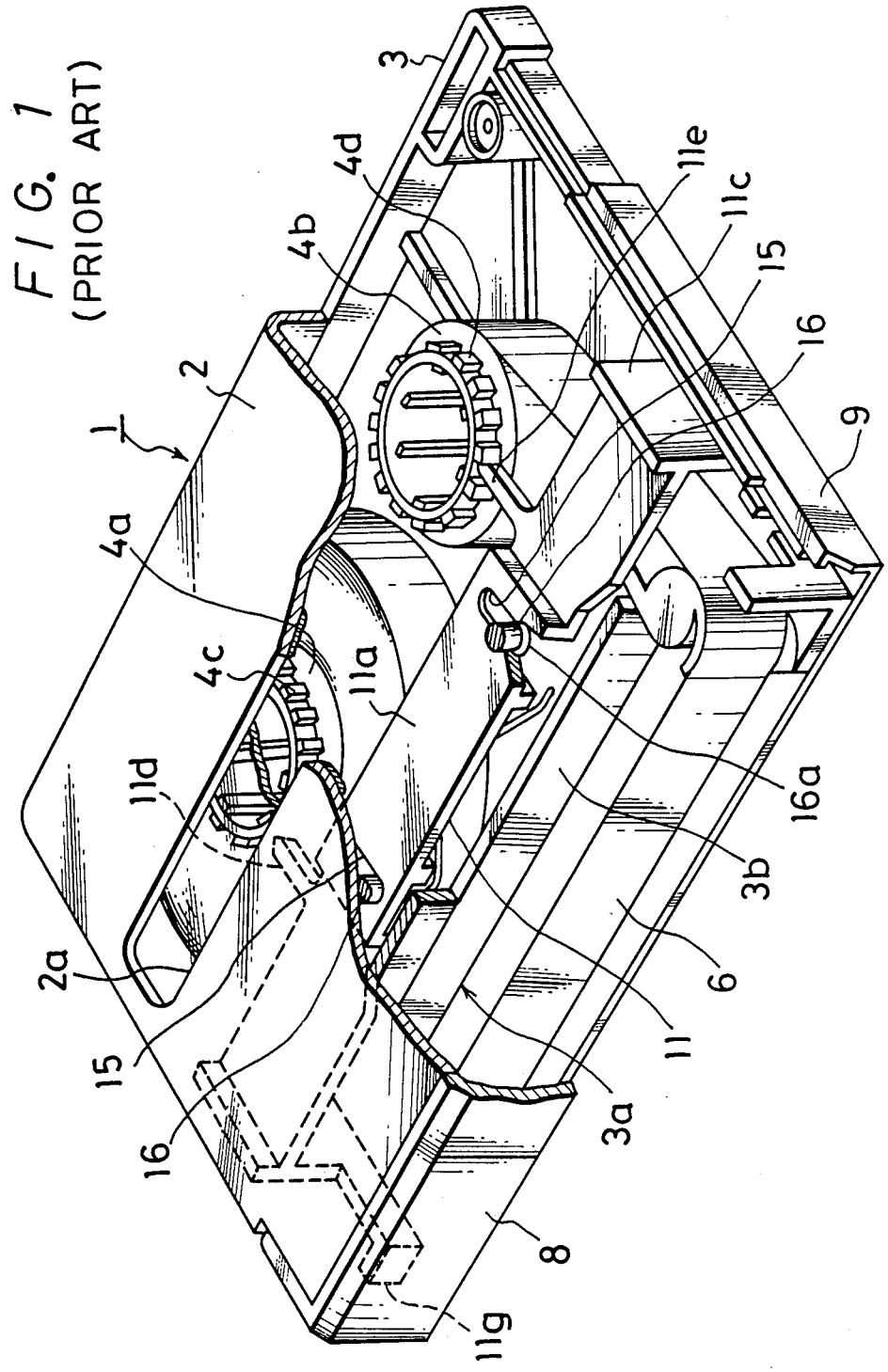
FIG. 1 is a partially cut-away perspective view of a prior art magnetic tape cassette.
Figure 2:
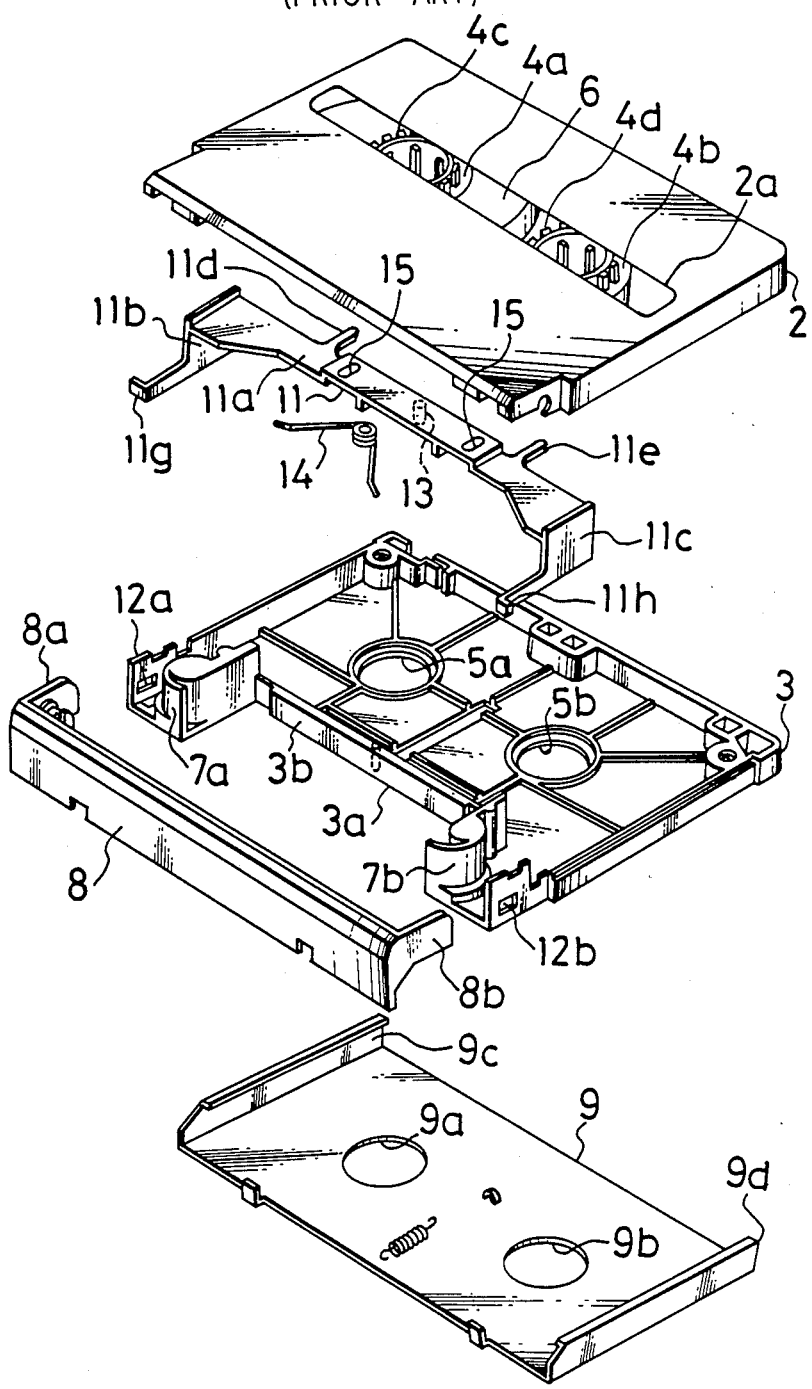
FIG. 2 is an exploded perspective view of the magnetic tape cassette shown in FIG. 1.
Figure 3:
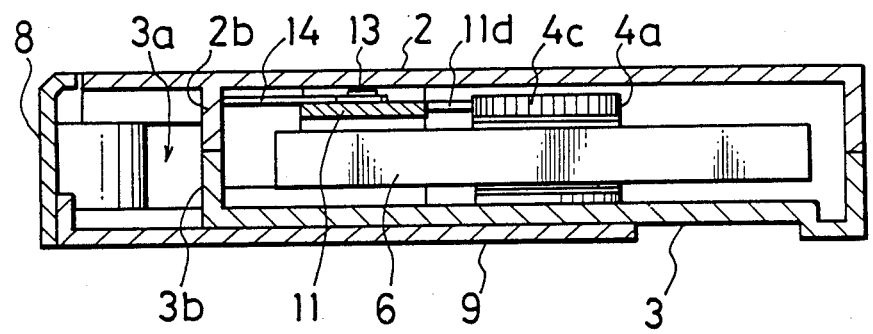
FIG. 3 is a cross-sectional side view of the magnetic tape cassette shown in FIG. 1.
Figure 4:
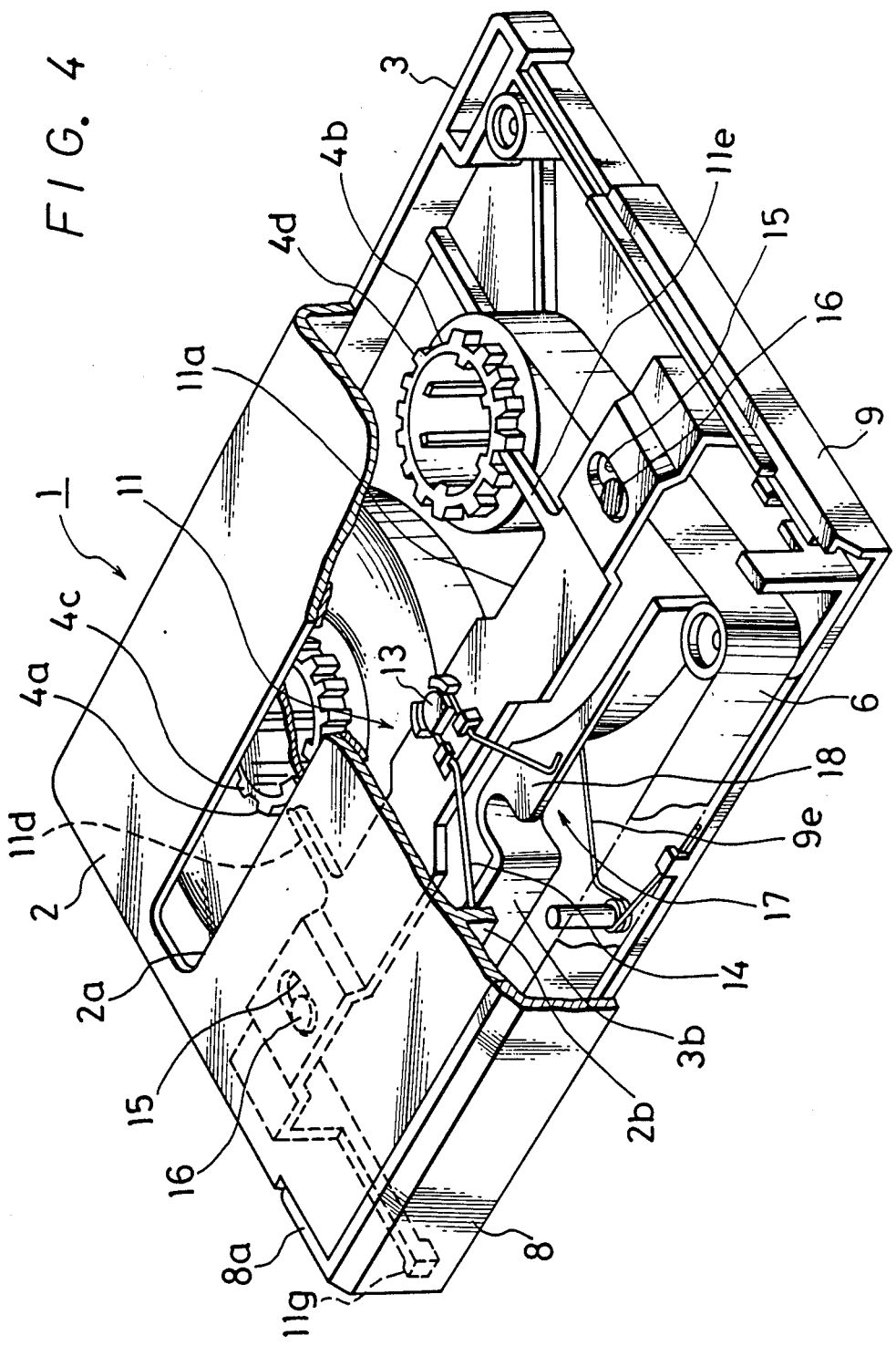
FIG. 4 is a partially cut-away perspective view of an embodiment of a magnetic tape cassette according to the present invention.
Figure 5:
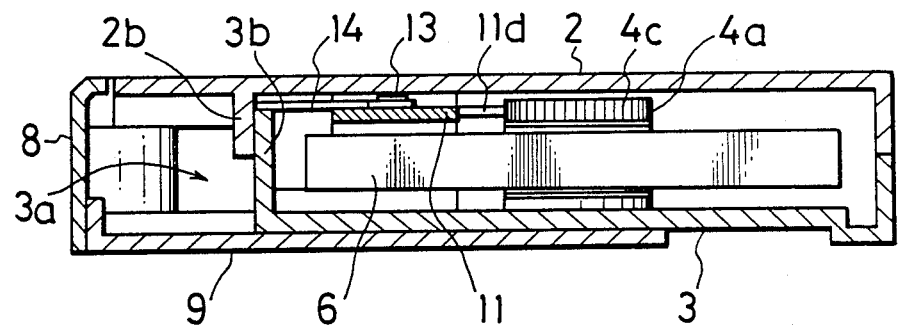
FIG. 5 is a cross-sectional side view of the magnetic tape cassette shown in FIG. 4.
Figure 6:
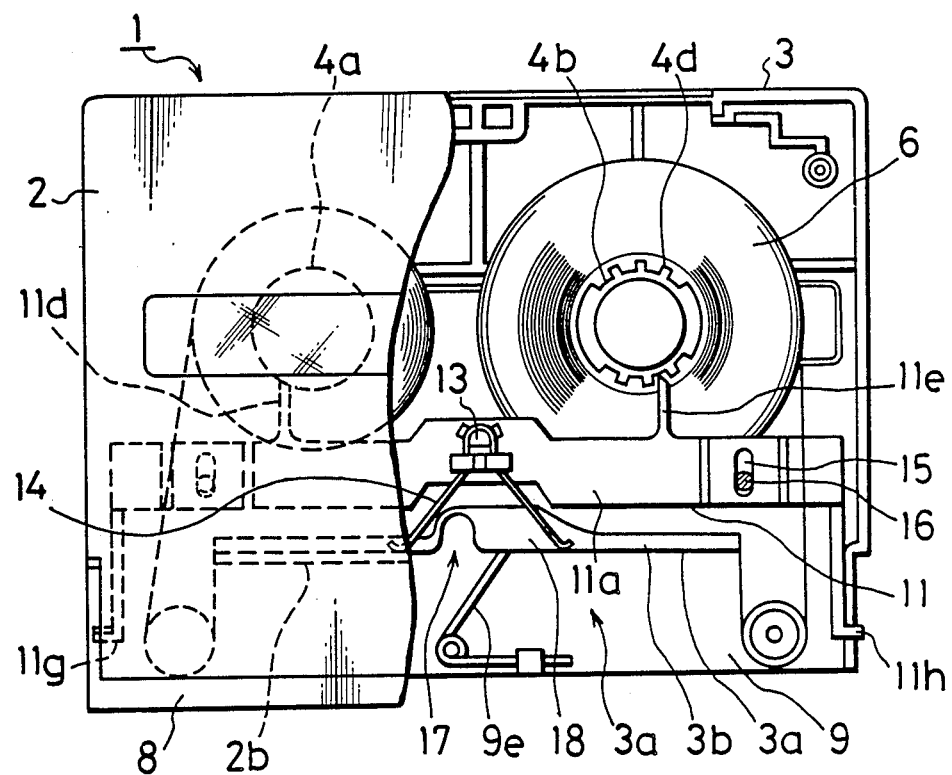
FIG. 6 is a partially cut-away plan view of the magnetic tape cassette shown in FIG. 4.

Now, an embodiment of a magnetic tape cassette according to the present invention will hereinafter be described with reference to FIGS. 4 to 6. In FIGS. 4 to 6, like parts corresponding to those of FIGS. 1 to 3 are marked with the same references and will not be described in detail.

In the embodiment of the magnetic tape cassette according to the invention, the front wall 3b of the lower half 3 is formed to be displaced rearwardly relative to the front wall 2b of the upper half 2.

Specifically, the front wall 3b of the lower half 3 is formed at a position rearwardly of wall 2b, that is, at the position withdrawn to the side in which the magnetic tape 6 is accommodated by the thickness of the front wall 2b of the upper half 2. The height of front wall 3b is selected so that the upper surface thereof is at substantially the height of the upper surface of the brake member 11 and the attaching portion of the spring 14 for biasing the brake member 11.

Further, in this embodiment at a position slightly offset toward the right-hand side from the central portion of the front wall 3b, there is formed a receiving concave portion 17 in which the retainer pin for a spring 9e used as a biasing member for biasing the sliding member 9 and the spring, are accommodated or received when the spring is bent, with the sliding member 9 slidably moved rearward. An upper plate portion 18 is formed so as to cover the upper surface of the receiving concave portion 17.

When the upper half 2 and the lower half 3 are assembled with the brake member 11 mounted on the upper half 2 as set forth above, the rear surface of the front wall 2b of the upper half 2 and the front surface of the front wall 3b of the lower half 3 overlap to each other to shield the front cut-away portion 3a of the cassette housing 1. In this state, the end portions of the spring 14 for the brake member 11 are held, or trapped, in the space between the upper end face of the front wall 3b of the lower half 3 and the rear surface of the front wall 2b of the upper half 2 and supported on the upper end face, or surface of the front wall 3b of the lower half 3. One end portion of this spring 14 is supported on the upper plate portion 18 of the receiving concave portion 17.

Since the end portions of the spring 14 of the brake member 11 are held in the spacing between the front wall 3b of the lower half 3 and the rear surface of the front wall 2b of the upper half 2, even when a strong impact is applied to the cassette housing 1 or the like, the end portions of the spring 14 are prevented from slipping on the front wall 2b of the upper half 2 to the under side. Thus, the spring 14 can bias the brake member 11 positively so that the brake member 11 can operate smoothly. Further, the spring 14 is positively prevented from interfering with the magnetic tape 6.

Furthermore, in accordance with this embodiment, one end portion of the spring 14 is supported by the wide area of the upper plate portion 18 covering the receiving concave portion 17 so that even when a particularly strong impact is applied to the cassette housing 1, the spring 14 is prevented from escaping from the spacing between the front wall 3b of the lower half 3 and the rear surface of the front wall 2b of the upper half 2.

The above description is given on a single preferred embodiment of the invention but it will be apparent that many modifications and variations could be effective by one skilled in the art without departing from the spirit or scope of the novel concepts of the invetnion, so that the scope of the invention should be determined by the appended claims only.

I claim as my invention:

1. A magnetic tape cassette comprising:
    (a) a cassette housing formed of an upper half and a lower half, each having a front wall, the front wall of said lower half having an upper surface, and the front wall of said upper half haivng a rear surface;
    (b) a pair of reel hubs incorporated in said cassette housing and around which a magnetic tape is wound;
    (c) a brake member for restricting the rotation of said pair of reel hubs; and
    (d) V-shaped spring means for biasing said brake member in a direction engaging said brake member with said pair of reel hubs, said spring means being secured at its intermediate portion to said brake member and contacted at its end portions with a rear surface of the front wall of said upper half, said front wall of said lower half being positioned rearwardly from the front wall of said upper half and formed to have a height overlapping the rear side of the front wall of said upper half, whereby the end portions of said spring means are tapped above said upper surface of the front wall of said lower half.

2. A magnetic tape cassette according to claim 1, wherein said upper surface further comprises an upper flow plaate portion on which the end portions of said spring means are supported.

3. A magnetic tape cassette according to claim 1, wherein said rear surface comprises a downwardly facing surface adjacent the front wall of said upper half and spaced forwardly from said upper surface.

* * * * *